United States Patent [19]

Proulx

[11] 4,259,782

[45] Apr. 7, 1981

[54] FLAIL FEEDOUT MECHANISM FOR A ROTARY MOWER

[76] Inventor: Raymond E. Proulx, 5837 Cameo St., Alta Loma, Calif. 91701

[21] Appl. No.: 75,691

[22] Filed: Sep. 14, 1979

[51] Int. Cl.³ .......................................... A01D 50/00
[52] U.S. Cl. ........................................ 30/276; 56/12.7
[58] Field of Search .................... 30/276, 347; 56/12.7

[56] References Cited

U.S. PATENT DOCUMENTS

| | | | |
|---|---|---|---|
| 4,104,796 | 8/1978 | Sheldon | 30/276 |
| 4,131,997 | 1/1979 | Utter | 30/276 |
| 4,151,646 | 5/1979 | Lane | 30/276 |
| 4,169,311 | 10/1979 | Evenson | 30/276 |
| 4,183,138 | 1/1980 | Mitchell | 56/12.7 X |
| 4,195,408 | 4/1980 | Palmieri | 30/276 |
| 4,203,212 | 5/1980 | Proulx | 30/276 |

Primary Examiner—Jimmy C. Peters
Attorney, Agent, or Firm—Boniard I. Brown

[57] ABSTRACT

A convenience improvement in rotary mowers, trimmers and edgers of vegetation that have a rotating body from which one or more flexible cord-like filamentous cutting blades or flails extend radially so that additional flail length can be fed from the device by merely bumping the rotating body on the ground. The improvement includes a plurality of spline lugs on one portion which extend into a serpentinous cam slot on another. Bumping of the device on the ground causes the lugs to move from stable positions to other stable positions allowing relative movement between the outer case of the mower and a spool of flail therein so that predetermined length of flail is fed out through the case.

11 Claims, 10 Drawing Figures

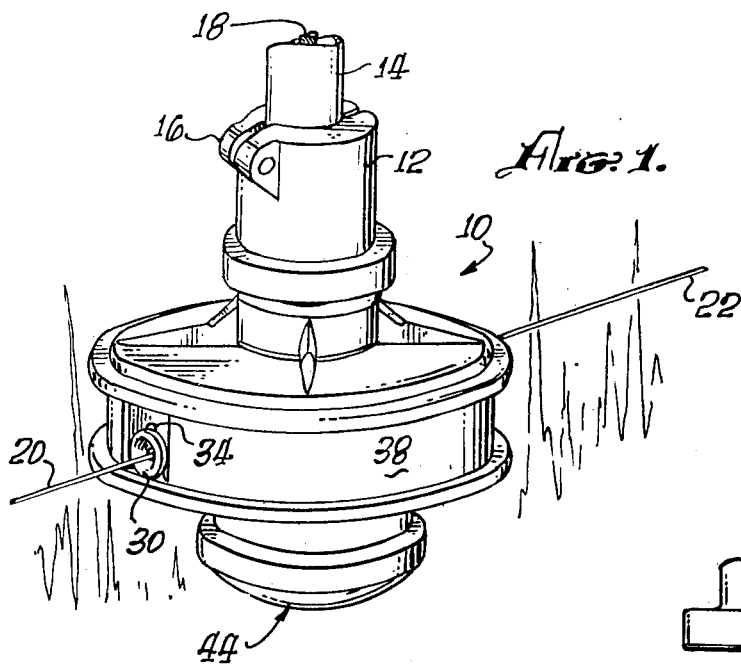
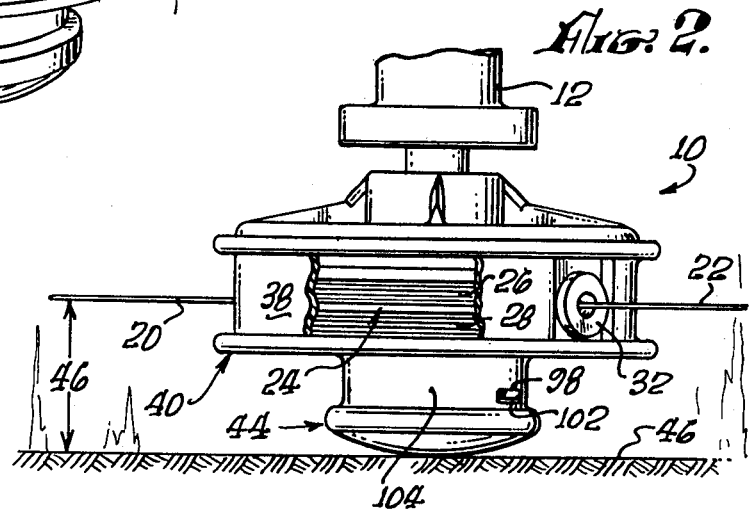
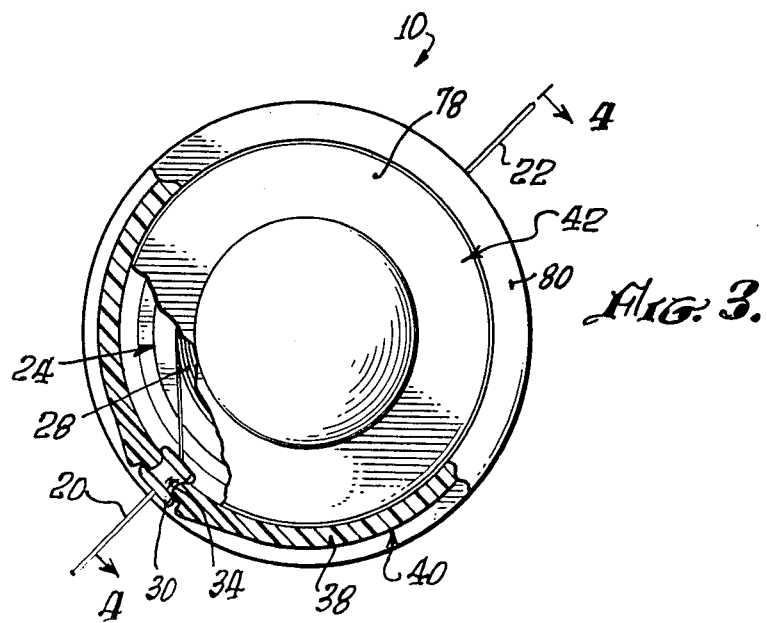

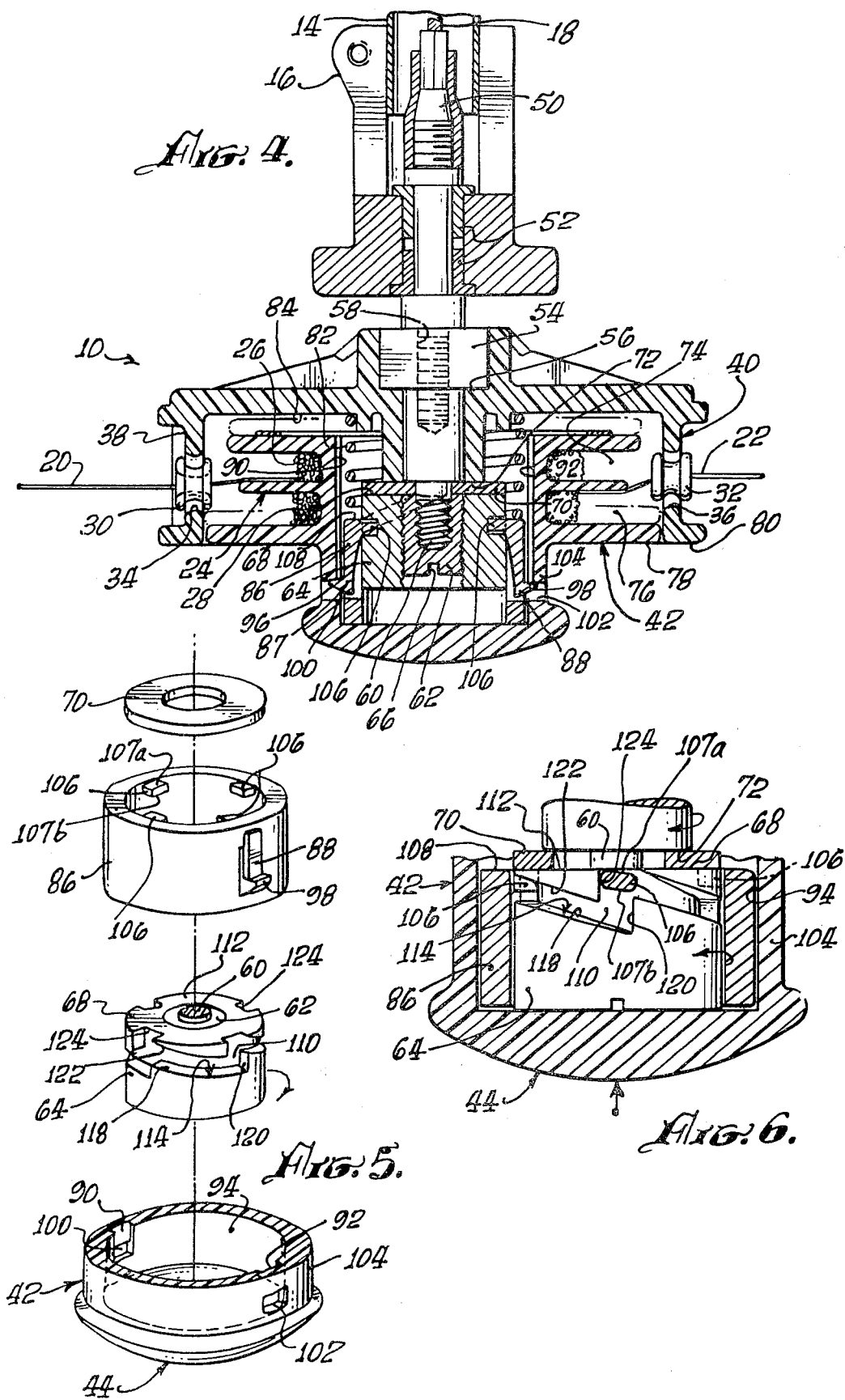

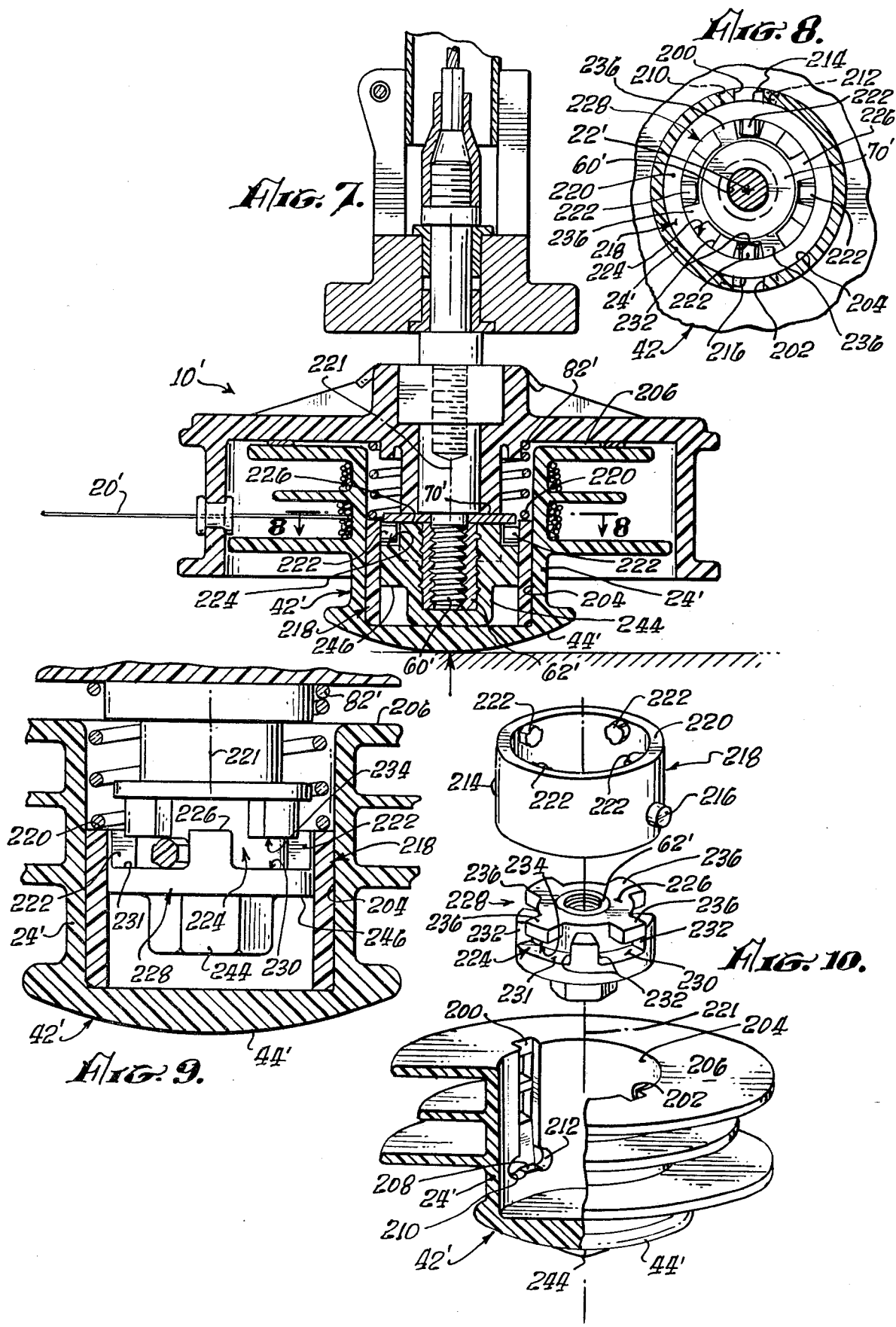

FLAIL FEEDOUT MECHANISM FOR A ROTARY MOWER

BACKGROUND OF THE INVENTION

This invention relates to improved flail feedout means for mowing and trimming devices used to trim grass, weeds, and other vegetation, of the rotary type equipped with flexible cord-like flails formed of generally cylindrical fibers. Grass and weed cutters of this general type are now widely used. Examples are described in REBER, U.S. Pat. No. 3,664,102; BALLAS et al, U.S. Pat. No. 3,826,068; MIZUNO et al, U.S. Pat. No, 4,020,552; BALLAS et al, U.S. Pat. No. 4,035,912; PROULX, U.S. Pat. No. 4,097,991; PERDUE, U.S. Pat. No. 4,134,204; TORO, Belgium Patent No. 852,150; and co-pending U.S. Patent Application Ser. No. 881,193. Such devices are available on the market having automatic flail feedout mechanisms which respond to a bump on the ground intentionally applied by the operator or by application of force applied thereto by some mechanical arrangement. Such mechanisms usually consist of a dog or friction clutch located between a spool of flail and the case thereabout through which the flail is fed. By bumping an extension of the spool on the ground, the friction clutch is disengaged for a length of time dependent on the duration of the bump. The dog clutch released by the bump then abruptly engages at the next opportunity to feedout flail in segment lengths which are related to the engagement points of the dog clutch. Such dog clutches have outwardly extending ribs which engage inwardly extending abutment tangs and therefore depend upon a skillful bump when it is desired that they move only one segment. However, friction within the device and over zealous bumping can result in two or more line segments being fed out, especially when the device has been in use and the corners on the ribs and tangs have worn so that positive engagement is no longer assured. The abrupt operation of the dog clutch insures that the wear takes place. Therefore, there has been a need for a feedout mechanism which automatically feeds out a predetermined length of flail per bump, which does not lose this capability quickly with use, and which is easy to construct and maintain.

SUMMARY OF THE INVENTION

The present rotary mowing and trimming device employing a flail feedout is constructed on the same basic plan as those shown in Applicant's U.S. Pat. No. 4,097,991 referred to above. The mower icludes a handle with drive means which are connected to a spinning housing which contains a spool of one or more coils of filaments used for flails, an orifice through the housing for each coil for extending the flail outwardly into cutting position, and means which normally restrict movement between the spool and the housing but can be released a predetermined rotational distance so that additional flail length can be fed out of the orifice.

These last mentioned means include, as part of the spool, a downwardly projecting bumper which is normally used to space the flail above the surface on which vegetation is being cut. The spool, bumper, and an intermediate member, as an assembly, are spring loaded downwardly with respect to the spinning housing. Extending inwardly from the intermediate cylinder are tangs which ride in a serpentinous cam slot in a cam member fixed to the housing. When the bumper is bumped on the ground, the intermediate cylinder is moved upwardly so that its tangs ride up relatively vertical cam surfaces until they reach spiral surfaces which extend downwardly to the next vertical cam surfaces. The net effect is that the spool, connected to the intermediate members, and the housing, connected to the cam member, rotate relative to each other to allow a predetermined length of flail to feed out by centrifugal force. Since a serpentinous cam is used, a single bump can produce only one segment of flail feedout, and does so without the crunching engagement of the prior art dog clutches.

It is therefore an object of the present invention to provide improved means for automatically feeding flail out of a rotary mower.

Another object is to provide automatic flail feedout means which are reliable, easy and economical to manufacture, and reliable in the harsh environment in which mowers are used.

Another object is to provide a mower which feeds out a predetermined amount of flail when desired.

Another object is to provide an automatic flail feedout mechanism which operates relatively smoothly so that its performance does not degrade with use.

These and other objects and advantages of the present invention will become apparent to those skilled in the art after considering the following detailed specification in conjunction with the accompanying drawings wherein:

BRIEF DESCRIPTION OF THE DRAWINGS

FIG. 1 is a perspective view of a complete mower cutting head constructed according to the present invention, in cutting position on the ground;

FIG. 2 is a side view of the cutting head of FIG. 1, showing its normal relationship with respect to the ground;

FIG. 3 is a partial cross-sectional bottom view of the head of FIGS. 1 and 2;

FIG. 4 is a cross-sectional view taken at line 4—4 of FIG. 3;

FIG. 5 is an exploded view of the automatic flail feedout mechanism;

FIG. 6 is a partial cross-sectional view of the lower portion of FIG. 4 rotated 90°;

FIG. 7 is a view similar to FIG. 4 of an embodiment having a modified flail feedout;

FIG. 8 is a cross-sectional view taken at line 8—8 of FIG. 7;

FIG. 9 is an enlarged partial cross-sectional view of the modified flail feedout; and FIG. 10 is an exploded view of the modified flail feedout.

DESCRIPTION OF THE PREFERRED EMBODIMENT

Referring to the drawings more particularly by reference numbers, FIGS. 1 and 2 show a cutting head 10 of a flail type vegetation cutter. The cutting head 10 is mounted for rotation on a bearing block 12 which is fastened to a hollow handle 14 by means such as the frictional clamp portion 16 of the bearing block 12. The cutting head 10 is rotated by a flexible shaft 18 which passes through the handle 14 and is rotatably driven by suitable motor means (not shown). One or more filamentous flexible flails 20 and 22 are impelled into a radially extending attitude by the centrifugal force generated by the rotation of the head 10. The flails 20 and 22 cut the grass or other vegetation by whip-like impact. It is preferable that the flails 20 and 22 be of nylon filament which is stored on a split spool 24 in separate coils 26 and 28, respectively, as shown in FIG. 2. The flails 20 and 22 extend outwardly from the coils 26 and 28 through grommets 30 and 32 which are held in slots 34 and 36, respectively in the cylindrical skirt portion 38 of the cutting head 10.

The cutting head 10 is made in two main components, a cap 40 and a spool assembly 42. The spool assembly 42 includes a downwardly projecting bumper 44 which is designed for relatively frictionless spinning contact with the ground 46. Its main function is to allow the operator to accurately gauge the height 48 of the flails 20 and 22 above the ground 46.

As can be seen in FIG. 4, suitable shaft means 50 are connected to the flexible shaft 18 and extend through a bearing 52 in the bearing block 12 down into the cap 40 to spin it relative to the block 12. The cap 40 includes a stud support member 54 which extends into a stepped orifice 56 in the cap 40 and includes an upwardly facing, threaded bore 58 for engagement with the shaft 50, and a downwardly extending screw 60. The screw 60 is threadedly engaged by an insert 62 usually molded in a cam member 64. The insert 62 usually includes a screwdriver slot 66 which allows the cam member 64 to be tightly threaded onto the screw 60 so that the upper surface 68 thereof forces a washer 70 against a lower radial surface 72 of the cap 40 and member 54. This assures that the cam member 64 turns with the cap 40 as it is being driven.

The spool assembly 42 includes the spool 24 which has concentric chambers 74 and 76 to retain the coils 26 and 28 in position to be fed out through the grommets 30 and 32. The lower chamber wall 78 of the lower chamber 76 forms the bottom surface of the spool chambers and it is generally in alignment with the undersurface 80 of the cap 40 when the mower 10 is in a non-bumped configuration.

When it is desired to increase the length of the flails 20 and 22 by feeding additional filament from the coils 26 and 28, the head 10 is lifted and then bumped on the ground so that the bumper 44 abruptly contacts the ground. Since the bumper 44 is integral with the spool assembly 42, this forces the spool assembly 42 upwardly so that the lower chamber wall 78 reaches the location shown in phantom outline in FIG. 4. This motion is resisted by an internal concentric spring 82 which acts between an interior radial, downwardly facing surface 84 of the cap 40 and an intermediate cylindrical member 86 hereafter called the follower member. The follower member 86 is locked in radial position to the spool assembly 42 by means of outwardly extending ribs 87 and 88 which slide in vertical slots 90 and 92 in the inner cylindrical surface 94 of the spool assembly 42 (FIG. 5). The follower member 86 is retained in vertical position by resilient outwardly extending tabs 96 and 98 which mate with appropriately positioned slots 100 and 102 extending through the support column 104 of the bumper 44. When it is desired to release the spool assembly 42 from the cap 40 to enable the loading of new coils of filament, the tabs 96 and 98 are pushed inwardly to release the spool assembly 42 so that it can be lowered away from the cap 40 and the follower member 86. The ribs 87 and 88 slide along the slots 90 and 92 in the inner spool surface 94 to index the tabs 96 and 98 to the slots 100 and 102 when it is desired to reassemble the spool assembly 42 within the cap 40.

The follower member 86 also includes a plurality of inwardly facing tangs 106 which have upper and lower surfaces 107a and 107b. The tangs 106 are located adjacent the upper surface 108 of member 86. The tangs 106, whose positions and spacing determine in part the amount of filament segment released per bump, ride in a serpentinous cam groove 110 formed adjacent to the upper surface 112 of the cam member 64. The cam 110 has a bottom surface 114 which is perpendicular to the outer cylindrical surface 116 of the cam member 64. The surface 114 includes a plurality of downwardly spiraling ramp portions 118 and vertical abutment surfaces 120, while the upper surface 122 of the cam 110 is a plurality of downwardly spiraling ramp surfaces evenly spaced from surface portions 118. It is preferable that the angle of surfaces 107a and 107b match the angle of the ramp. The upper surfaces 122 extend to the surface 112 so that cutouts 124 are formed into which the tangs 106 of the follower member 86 can be fitted. Since the spring 82 bears against the upper surface 108 of the follower member 86, it tends to force the tangs 106 downwardly until they come to rest in abutment with the vertical cam surface portions 120 and the lower portion of the lower ramps 118. This is the normal stable position therebetween and is shown in FIG. 4.

When the bumper 44 is struck against the ground, it and the follower member 86 are forced upwardly with respect to the cam member. This causes the tangs 106 to be forced above the vertical surface 120 so that the tangs 106 are free to travel in predetermined rotational distance as determined by the length of the ramp portions of the cam 119, which in the embodiment shown is 90°. The tangs 106 are prevented from exiting through the cutouts 124 in the top of the cam 110 in which they were inserted, by the lower surface 126 of the washer 68 held thereagainst, as aforesaid. The tangs 106 and the cam 110 enable a smooth and predictable line playout of a predetermined length by merely bumping the head 10 on the ground. When the tangs 106 travel down the ramps formed in the cam 110, they have a tendency to bounce the head 10 off of the ground so that the tangs 106 advance only one portion of the cam 110, whereas the prior art devices when pushed down will continue to play out line until the pressure is released, allowing the dog or friction clutches therein to reengage. In this manner the present device automatically causes the bump and assures an accurate flail feedout operation.

In some instances, the operator holds the bumper 44 on the ground instead of bouncing it to obtain a flail feedout. When this occurs, it is possible to continuously feedout successive lengths of flail 20 or 22. To solve this problem, the modified embodiment 10', as shown in FIGS. 7 through 10, is employed. In FIGS. 7 through 10 the similar parts are given the same numbers as in FIGS. 1 through 7 with a prime (') added thereto.

The modified embodiment 10' includes a modified spool assembly 42' having two axially aligned grooves 200 and 202 in its inner cylindrical surface 204. The grooves 200 and 202 extend from the top surface 206 of the spool 24' down to a radially oriented abutment surface 208 having lateral cutouts 210 and 212 adjacent thereto. The grooves 202 receive outwardly extending knobs 214 and 216 which slide therealong and lock a follower member 218 to which the knobs 214 and 216 are mounted to rotate with the spool 24'. When the cutting head 10' is in operation, the normal position of the knobs 214 and 216 is locked in the cutout 210 or 212 depending upon the rotation of the spool 24' as shown in FIG. 8. The embodiment 10 must be rotated in a predetermined direction whereas the modified embodiment 10' can be rotated either clockwise or counterclockwise and will still operate in an identical fashion.

When the bumper 44' is bounced or momentarily pressed on the ground, the knobs 214 and 216 are forced out of the cutouts 210 or 212, wherein they are retained against the force of spring 82' to hold the spool in assembly, and they ride upwardly in the grooves 200 and 202 against the force of the biasing spring 82' which presses downwardly on the upper surface 220 of a follower member 218. Rotation of spool assembly 42' is slowed or stopped during the bounce or pressing of the bumper 44' against the ground to allow line to feed out. When the bumper 44' is no longer pressed against the ground, the knobs 214, 216 are spring-urged back into cutouts 210, 212 to again retain the spool. As shown in FIG. 7, the knobs 214 and 216 generally are of cylindrical shape and are oriented to extend radially outwardly with respect to the axis 221 of the follower member 218.

The follower member 218 also includes a plurality of inwardly facing tangs 222 adjacent the upper surface 220 of the follower member. The positions and spacing of the tangs 222, like tangs 106, determine in part the amount of filament segment 20' released per filament release cycle. The tangs 222 ride in a serpentinous cam groove 224 formed adjacent the upper surface 226 of a cam member 228 whose function is similar to that of cam member 64. The groove 224 has radially oriented lower surfaces 230, 231 and vertical abutment portions 232 at about 90° to the bottom surfaces 231. The upper surface 234 of the cam groove 224 is formed by a plurality of radially outwardly oriented generally rectangular tangs 236 so that the serpentinous path of the cam groove 224 jogs at right angles. As shown in FIGS. 8, 9 and 10, the tangs 222 are restricted to motion within the cam groove 224 and depending upon the rotational direction of the spool 24', the tangs 222 move from one adjacent vertical surface 232 to the next facing in the same direction. The tangs 222 include sidewardly facing planar abutment surfaces which assist in reducing the hammering pressures when the tangs 222 move from abutment with one surface 232 to the next.

The cam member 228 is rotated by threaded attachment by way of an insert 62' molded into the member 228. The member can be removed from the screw 60' by application of torque to a nut shaped portion 244 molded in the bottom surface 246 of the member 218.

Thus there has been shown and described novel automatic flail feedout mechanisms which fulfill all of the objects and advantages sought therefor. Many changes, modifications, variations and other uses and applications of the subject invention will, however, become apparent to those skilled in the art after considering the foregoing specifications together with the accompanying drawings and claims. All such changes, modifications, variations, and other uses and applications which do not depart from the spirit and scope of the invention are deemed to be covered by the invention which is limited only by the claims which follow.

What is claimed is:

1. In a mower having a least one cutting flail which extends outwardly from a spinning assembly including two major assemblies, a cap assembly and a spool assembly having an axis of rotation, a bumper for engagement with the ground and means to allow predetermined lengths of flail to feed outwardly in response to the striking of the bumper on the ground, the improvement comprising:
   a cam member having a cam slot therein connected to one of said assemblies;
   a follower member connected to the other of said assemblies and having at least one cam follower thereon positioned to ride in said cam slot, and at least one outwardly extending knob, said spool assembly surrounding said follower member and having at least one groove parallel to said axis of said spool assembly, said groove having parallel side walls, a lower end and at least one lateral cutout, said knob being positioned in said lateral cutout to releasably retain said follower member to said bumper; and
   bias means acting between said cam member and said follower member tending to urge said cam follower into stable positions on said cam slot when undisturbed by force applied to said bumper and adapted to be overcome by suitable force applied to said bumper, said cam slot having at least one portion generally parallel to the force applied by said bias means.

2. The mower defined in claim 1 wherein:
   said cam slot is a serpentinous cam slot having upper portions formed by the radial surface of a washer.

3. The mower defined in claim 2 wherein said cam follower includes:
   at least one planar surface positioned to abruptly engage said serpentinous cam slot with at least one curved surface adjacent thereto to slide along said serpentinous cam slot.

4. The mower defined in claim 1 wherein said cam follower includes:
   at least one planar surface positioned to abruptly engage said cam slot with at least one curved surface adjacent thereto to slide along said cam slot.

5. The mower defined in claim 1 wherein said at least one lateral cutout is two lateral cutouts positioned on parallel side walls of said axially aligned groove so that said spool can be driven in opposite directions and said outwardly extending knob retains said spool to said cam follower.

6. The mower defined in claim 5 wherein said at least one axially aligned groove is two similar axially aligned grooves and said at least one outwardly extending knob is two outwardly extending knobs positioned in said two similar axially aligned grooves.

7. The mower defined in claim 6 wherein said at least one cam follower includes an outwardly extending tang having planar side surfaces and curved upper and lower surfaces.

8. The mower defined in claim 1 wherein said at least one cam follower includes an outwardly extending tang having planar side surfaces and curved upper and lower surfaces.

9. In a mower having at least one cutting flail which extends outwardly from a spinning assembly including two major assemblies, a cap assembly and a spool assembly having a bumper for engagement with the ground and means to allow predetermined lengths of flail to feed outwardly in response to the striking of the bumper on the ground, the improvement comprising:
   a cam member having a serpentinous cam slot therein connected to one of said assemblies;
   a follower member connected to the other of said assemblies and having at least one cam follower thereon positioned to ride in said slot, and at least one outwardly extending knob, said spool assembly surrounding said follower member and having at least one axially aligned groove with parallel side walls, a lower end and at least one lateral cutout, said knob being positioned in said lateral cutout to releasably retain said follower member to said bumper; and bias means acting between said cam member and said follower member tending to urge said cam follower into stable positions on said serpentinous cam slot when undisturbed by force applied to said bumper and adapted to be overcome by suitable force applied to said bumper, said serpentinous cam slot having at least one portion generally parallel to the force applied by said bias means.

10. The mower defined in claim 9 wherein:
said serpentinous cam slot has upper portions formed by the radial surface of a washer.

11. The mower defined in claim 9 wherein said cam follower includes:
at least one axially aligned planar surface positioned to abruptly engage said serpentinous cam slot with at least one curved surface adjacent thereto to slide along said serpentinous cam slot.

* * * * *